(No Model.)
I. B. DILLON.
HEN'S NEST.
No. 294,974. Patented Mar. 11, 1884.
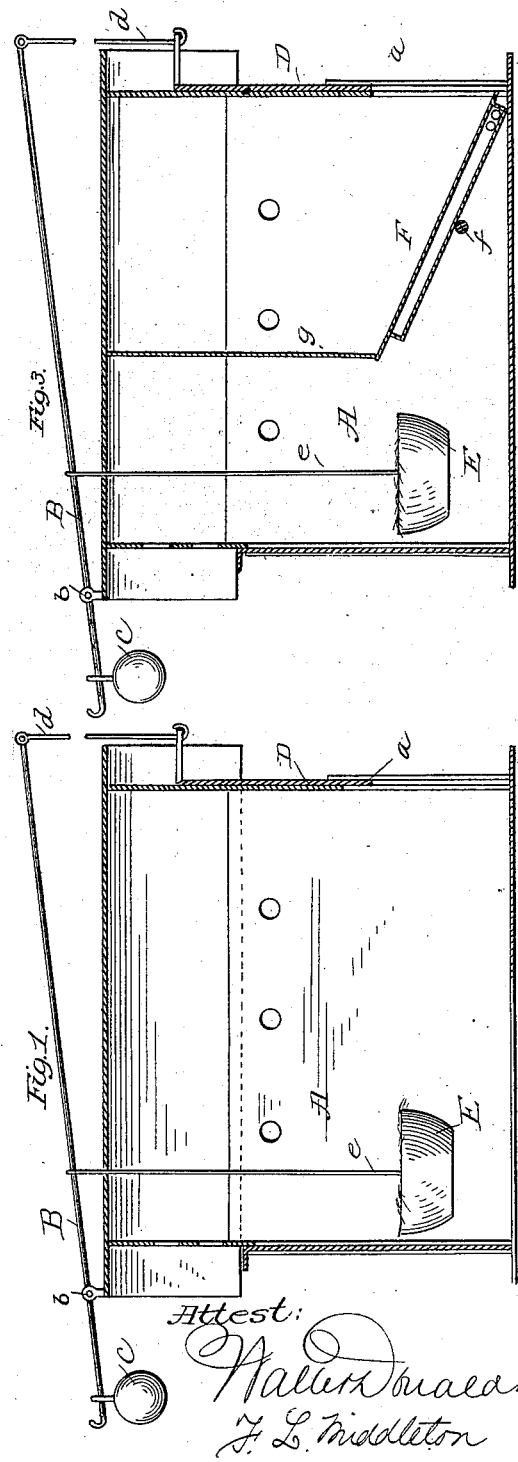
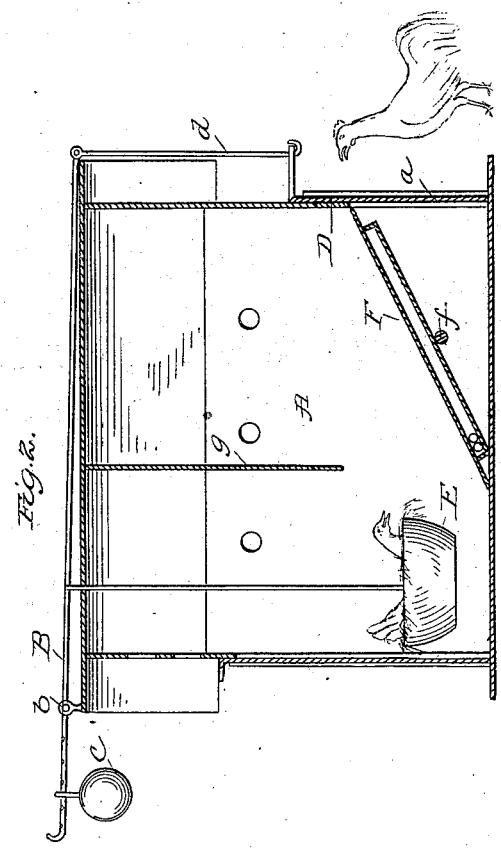
Attest:
Walter Donaldson
F. L. Middleton
Inventor
Ira B. Dillon
by Joyce + Spear
Attys

UNITED STATES PATENT OFFICE.

IRA B. DILLON, OF VISALIA, CALIFORNIA.

HEN'S NEST.

SPECIFICATION forming part of Letters Patent No. 294,974, dated March 11, 1884.

Application filed October 26, 1883. (No model.)

*To all whom it may concern:*

Be it known that I, IRA B. DILLON, of Visalia, in the county of Tulare and State of California, have invented a new and useful Improvement in Hens' Nests; and I do hereby declare that the following is a full, clear, and exact description of the same.

My invention is an improved hen's nest or hatching-house for domestic fowls. The object of it is to secure the fowls from intrusion while upon the nest, and at the same time to permit free ingression and egression.

To this end my invention consists of a suspended nest in combination with a suspended door, whereby the weight of the fowl closes the door, and when the fowl leaves the nest the door is permitted to rise.

It consists, also, in combination with the nest and door, of a pivoted platform which closes the house under all circumstances, but permits free passage in and out.

In the accompanying drawings, Figure 1 shows a central longitudinal section vertically through the center of the box or house without the platform. Fig. 2 shows a similar section with the platform in position and the fowl upon the nest. Fig. 3 shows a similar section, showing the position of the platform when the fowl has left the nest and box.

The box A may be of any suitable dimensions or shape adapted to the kind of fowl to which it is intended. There is a door, a, and such windows as may be required. Upon the top is a lever, B, pivoted at b, having an adjustable weight, C. One end of the lever projects over the front end of the box, and the other end projects slightly over the rear end of the box, and is connected to a sliding door, D, by means of a rod, d. Within the box is a nest, E, suspended from the lever B by a cord, e, passing through the roof of the box or house. The weight C is so adjusted on the end of lever B that when the nest E is empty the weighted end of the lever will fall and will raise or open the door D, thus allowing the fowl to go out of the box. The door remains open until the fowl returns to her nest, when the weight of the fowl, added to the weight of the nest, overcomes the weight C, draws down the lever B, and again closes the door, so that the hen is free from intrusion while setting. This arrangement, however, does not keep unauthorized fowls from entering the nest during the absence of its proper occupant, and to remedy this I have provided the supplemental device shown in Figs. 2 and 3. This consists of a platform, F, mounted upon a shaft, f, and extends into the door a and under a partition, g, the latter extending from the top of the box down to a position shown in Figs. 2 and 3. The platform F is so balanced that it will remain in the position in which it is left, so that when the fowl is upon the nest and enters by the door a, then the platform is in the position in Fig. 2, and it will remain in the position shown in Fig. 2. The nest and platform being in the position shown in that figure, the fowl having occasion to go out leaves the nest, and walks up the inclined platform F until it tips into the position shown in Fig. 3, which leaves free egression; but at the same time the inner end of the platform F is against the lower edge of the partition g of the box, sufficiently close, as it also is when in position of Fig. 2, the upper end of the platform being up against the upper edge of the door-opening. The platform F should be the width of the box inside, and fit a narrow piece projecting in the door a; but this is not absolutely necessary.

In order to secure the door and cause it to remain in position in which it is left, I fix underneath it a tube or channel containing a heavy ball, which rolls to the lower end, and this holds it down. I prefer to have some small openings in the wall at the outer end of the platform, so that the fowl may be led toward that point by the access of light.

It will be understood that the nest is suspended by the cord, so that the fowl has free access to and from the nest.

I claim as my invention—

1. The combination, with the box or house, of the lever B, pivoted at b, and provided on one end with weight C, the door D, suspended from the opposite end, and the nest E, suspended from lever B between the door D and pivot $b$, substantially as described, and for the purpose set forth.

2. The combination of the suspended nest on the lever B, the weight C, and the suspended door D with the pivoted platform F, the door $a$, and partition $g$, the parts being constructed and operated substantially as described.

In testimony whereof I have signed my name to this specification in the presence of two subscribing witnesses.

I. B. DILLON.

Witnesses:
 WILEY WATSON,
 JOSEPH GODCHAUX.